Sept. 26, 1939.  S. G. CLARKE  2,174,053
METHOD OF AND APPARATUS FOR TESTING THE THICKNESS OF METAL COATINGS
Filed April 28, 1937  2 Sheets-Sheet 1

S. G. Clarke
INVENTOR

By Glascock Downing Seebold
Attys.

Sept. 26, 1939.  S. G. CLARKE  2,174,053
METHOD OF AND APPARATUS FOR TESTING THE THICKNESS OF METAL COATINGS
Filed April 28, 1937  2 Sheets-Sheet 2

S. G. Clarke
Inventor

Patented Sept. 26, 1939

2,174,053

UNITED STATES PATENT OFFICE 2,174,053

METHOD OF AND APPARATUS FOR TESTING THE THICKNESS OF METAL COATINGS

Sydney George Clarke, Surbiton, England, assignor to British Non-Ferrous Metals Research Association, London, England Application April 28, 1937, Serial No. 139,627
In Great Britain June 13, 1936

1 Claim. (Cl. 23—230)

This invention relates to the testing of metal coatings for the purpose of determining their thickness on which it is well known that the protective value of the coating largely depends.

It is also known that owing to unequal distribution of coating in the plating process or to loss in polishing some portions of the deposit may be thinner than is desired even if the average thickness over the whole surface should be sufficient and it therefore becomes a matter of importance to be able to determine the thickness of the coating at any point. Hitherto this has been effected by direct microscopic measurement of prepared sections involving a lengthy and tedious operation requiring considerable skill and expensive equipment.

The object of the present invention is to devise a simple process which may be readily carried out even by unskilled labour and capable of giving accurate results with very simple and inexpensive apparatus, and the invention consists in a method of testing the thickness of a coating of metal deposited on a basis metal which consists in causing a jet or stream of a corroding liquid to impinge upon a spot in the coating and measuring the time or amount of liquid required to penetrate the coating.

The invention also consists in apparatus for testing the thickness of a coating of metal deposited on a basis metal comprising means for rigidly clamping the specimen to be tested and means for causing a jet or stream of a corroding liquid to impinge under constant head upon a spot in the coating, the thickness of the coating being determined by the time or the amount of liquid required for penetration of the coating.

Further features of the invention will be apparent from the description given hereafter.

At this point it may be noted that by causing the corroding liquid to impinge in the form of a jet or stream on the surface to be tested difficulty in regulating the rate of application of the liquid is overcome, the rate of perforation of the coating is increased, a matter of importance where the coating metal is of a resistant character, and the definition of the point of perforation is improved.

The accompanying drawings illustrate one convenient form of apparatus in accordance with the invention.

Figure 1:
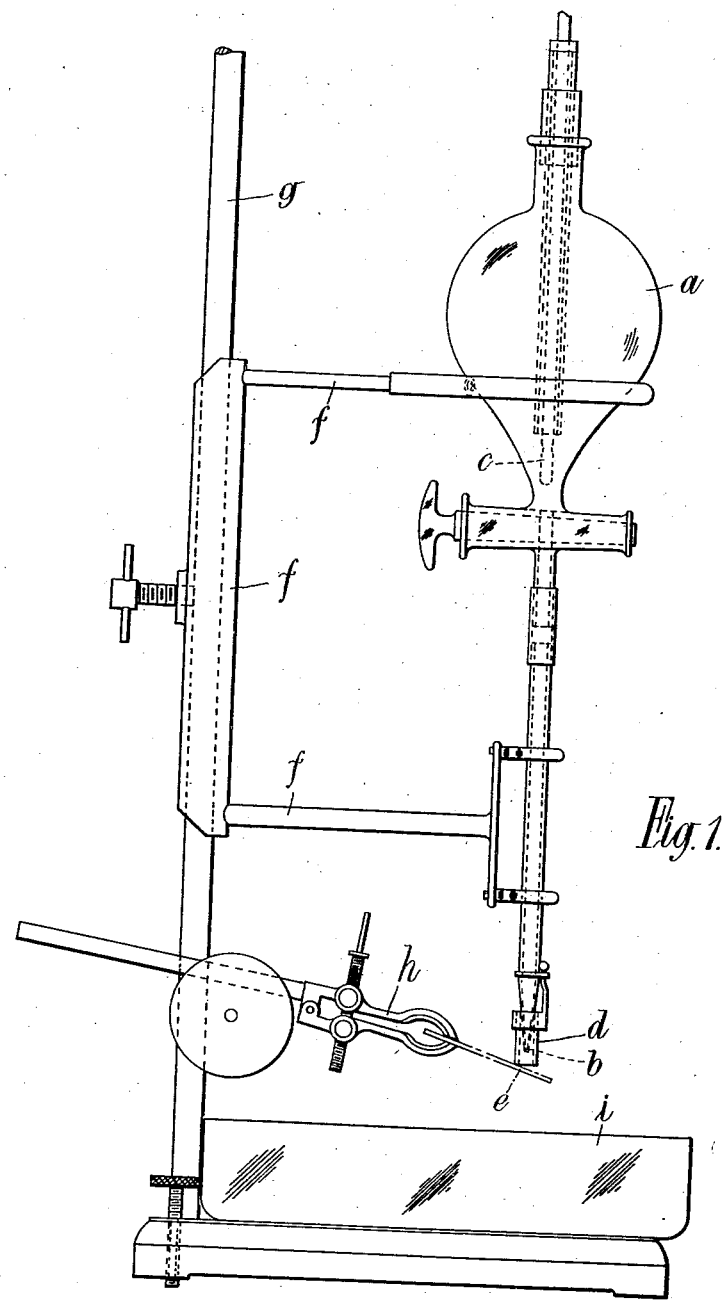
Figure 2:
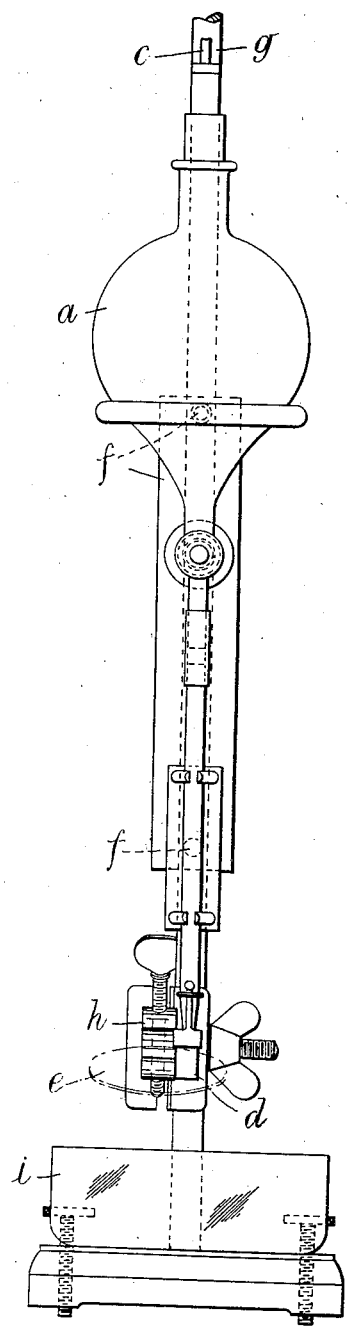

Figure 1 is a side elevation and
Figure 2 is a front elevation.

In carrying the invention into effect in one convenient manner there is provided a simple and inexpensive apparatus consisting of a tap funnel $a$ containing the reagent and fitted with a device to maintain a constant standard head of liquid above the tip of the jet $b$. A thermometer $c$ is incorporated in the device and a metal or other guard ring $d$ is preferably clipped on to the jet to fulfil the dual function of protecting the jet and ensuring that the specimen $e$ is the correct distance from the jet.

The whole jet and funnel assembly is mounted in a rigid attachment $f$ which clamps to the support rod $g$ on which is also secured the clamp $h$ to hold the specimen. The arrangement is such that the jet and funnel assembly may be swung bodily away from the specimen when not in use, while, when in use, there will be no relative movement between the jet and the specimen under test so that the liquid will impinge on exactly the same spot throughout the test.

Beneath the specimen is a dish $i$ to receive waste or spent liquid, which dish is preferably covered with a gauze lid (not shown) to prevent splashing.

In a specific construction of apparatus the tap funnel may have a capacity of about 100 millilitres while the size of the orifice of the jet is preferably such that the jet will deliver 10 millilitres of water in 30 seconds with the apparatus assembled.

It will, however, be understood that these details are given purely by way of example and may be modified in any manner found desirable in practice. If necessary or desirable suitable means may be adopted for maintaining the temperature constant.

The nature of the corroding liquid will depend upon the nature of the specimen to be tested and the apparatus is such that a jet of liquid may be caused to impinge upon a spot on the specimen, the operation being continued until the coating has been penetrated as determined by the colour or other characteristic of the spot of basis metal which will be visible as soon as the coating is penetrated.

The thickness of coating may be determined either by measuring the amount of liquid required or by measuring the time taken and the time measurement is conveniently effected by a stopwatch or clock of the "stop-and-go" type since it is usually necessary to stop the flow at intervals in order to determine whether the test spot has appeared and the timing instrument should obviously be such as to be capable of adding up the separate intervals of time during which the solution is flowing.

The apparatus and test-piece must be firmly clamped to prevent any relative movement between the jet and specimen and the method according to the invention is applicable to surfaces of widely varying size and shape, the main restriction being that there must be a free "run-off" for the solution, and the specimen should be mounted in such a manner that solution does not collect on the spot being tested.

In testing nickel coatings on steel, copper, brass, aluminium or zinc alloys a convenient solution consists of the following:

Ferric chloride_____grams per litre__ 150
Copper sulphate crystals_____do____ 100
Glacial acetic acid_____millilitres per litre__ 250

The ferric chloride is the hydrated material known as iron perchloride which should be of good quality and the solution is best prepared by dissolving the ferric chloride and copper sulphate in about one-half the required amount of water, then adding the acetic acid and diluting to volume in a graduated flask. Moreover, the solution usually requires filtering as there is generally some residue from the ferric chloride.

A similar solution may be applied for testing copper coatings on nickel, aluminium, zinc alloys or steel.

An alternative solution for testing copper coatings on steel or nickel may be composed of the following:

Ferric chloride_____grams per litre__ 150
Antimony oxide_____do____ 20
Hydrochloric acid (sp. gr. 1.16)
       millilitres per litre__ 200
Glacial acetic acid_____do____ 250

This solution may also be used for testing bronze coatings and is applicable also to electrodeposited bronze containing up to about 15 per cent. of tin.

For testing cadmium coatings on steel, copper, etc. the following solution is appropriate:

Ammonium nitrate_____grams per litre__ 17.5
Hydrochloric acid (normal)
       millilitres per litre__ 17.5

For testing relatively thin zinc coatings the above solution is also applicable while for thicker coatings an appropriate solution is the following:

Ammonium nitrate_____grams per litre__ 70
Hydrochloric acid (normal)
       millilitres per litre__ 70

The foregoing has been described with reference to the testing of single coatings but the invention is equally applicable to the testing of composite coatings such, for example, as nickel—copper—nickel on steel, nickel on copper on steel, and nickel on copper on zinc base die casting.

In all processes according to the invention the surface to be tested must be freed from grease and chromium coating, de-greasing being conveniently effected by rubbing the surface with a damp swab of cloth or cotton wool sprinkled with finely powdered magnesium oxide which is then washed off with water while the chromium can be readily dissolved in hydrochloric acid containing some dissolved antimony oxide and finally the article is dried by means of greaseless absorbent paper or cloth or rinsed with acetone and dried in air.

It will be understood, however, that the invention extends broadly to the testing of the thickness of a metal coating by applying thereto a continuous jet or stream of corroding liquid and measuring the time or the quantity of liquid required for penetration of the coating, and the foregoing details have been given purely by way of illustration to indicate the nature of the invention and not by way of limitation since the invention is applicable to a wide variety of coatings and a great variety of basis materials to which the coatings are applied.

I claim:

A method of testing the thickness of a coating of metal deposited on a basis metal which consists in causing a continuous stream of a corroding liquid under constant head to impinge upon a spot in the coating and measuring the time or amount of liquid required to penetrate the coating, said corroding liquid consisting of Ferric chloride_____grams per litre__ 150
Copper sulphate crystals_____do____ 100
Glacial acetic acid_____millilitres per litre__ 250

SYDNEY GEORGE CLARKE.